(12) United States Patent
Hashimoto et al.

(10) Patent No.: US 11,317,000 B2
(45) Date of Patent: Apr. 26, 2022

(54) IMAGE PROCESSING APPARATUS HAVING INVISIBLE COMPONENT REMOVER, IMAGE PROCESSING METHOD, AND RECORDING MEDIUM

(71) Applicants: Ayumu Hashimoto, Kanagawa (JP); Masamoto Nakazawa, Kanagawa (JP)

(72) Inventors: Ayumu Hashimoto, Kanagawa (JP); Masamoto Nakazawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/911,406

(22) Filed: Jun. 25, 2020

(65) Prior Publication Data

US 2021/0021729 A1    Jan. 21, 2021

(30) Foreign Application Priority Data

Jul. 16, 2019 (JP) .............................. JP2019-131121

(51) Int. Cl.
*H04N 1/028* (2006.01)
*H04N 1/00* (2006.01)
*H04N 1/409* (2006.01)

(52) U.S. Cl.
CPC ..... *H04N 1/02895* (2013.01); *H04N 1/00811* (2013.01); *H04N 1/00822* (2013.01); *H04N 1/409* (2013.01)

(58) Field of Classification Search
None
See application file for complete search history.

(56) References Cited

U.S. PATENT DOCUMENTS

2005/0243352 A1\* 11/2005 Fujiwara .............. H04N 1/6027
                                                                    358/1.9
2008/0252787 A1    10/2008 Nakazawa et al.
(Continued)

FOREIGN PATENT DOCUMENTS

CN        101790031 A      7/2010
JP        2000-283790 A    10/2000
(Continued)

OTHER PUBLICATIONS

Extended European Search Report dated Nov. 23, 2020 in European Patent Application No. 20185717.4, 9 pages.
(Continued)

*Primary Examiner* — Andrew H Lam
(74) *Attorney, Agent, or Firm* — Xsensus LLP

(57) ABSTRACT

An image processing apparatus includes a light source, an image sensor, and an invisible component remover. The light source emits visible component light and invisible component light to a target object. The image sensor receives reflected light from the target object to detect a visible invisible mixture image including an invisible component and a visible component and an invisible image including an invisible component. The invisible component remover, based on the visible invisible mixture image and the invisible image which have been detected, removes the invisible component from the visible invisible mixture image to generate a visible image. The invisible component remover includes a removal calculator performing a removal calculation process of an invisible component with respect to the visible invisible mixture image, and a noise reducer performing a noise reduction process on at least one of images to be input to and output from the removal calculator.

17 Claims, 19 Drawing Sheets

(56) References Cited

U.S. PATENT DOCUMENTS

| | | | |
|---|---|---|---|
| 2008/0283729 A1* | 11/2008 | Hosaka | H04N 9/04559 |
| | | | 250/208.1 |
| 2011/0261425 A1 | 10/2011 | Yamaguchi | |
| 2014/0211273 A1 | 7/2014 | Konno et al. | |
| 2015/0098117 A1 | 4/2015 | Marumoto et al. | |
| 2015/0163378 A1 | 6/2015 | Konno et al. | |
| 2016/0003673 A1 | 1/2016 | Hashimoto et al. | |
| 2016/0028920 A1 | 1/2016 | Hashimoto | |
| 2017/0163853 A1 | 6/2017 | Hata | |
| 2017/0295298 A1 | 10/2017 | Ozaki et al. | |
| 2019/0163964 A1* | 5/2019 | Kawamae | H04N 9/0451 |
| 2019/0327387 A1 | 10/2019 | Hashimoto et al. | |
| 2019/0335061 A1 | 10/2019 | Nakazawa et al. | |
| 2019/0340738 A1* | 11/2019 | Hartbauer | G06T 5/002 |
| 2020/0053229 A1 | 2/2020 | Hashimoto et al. | |
| 2020/0053230 A1 | 2/2020 | Nakazawa et al. | |
| 2020/0053233 A1 | 2/2020 | Nakazawa et al. | |
| 2020/0077010 A1* | 3/2020 | Noguchi | H04N 5/2354 |

FOREIGN PATENT DOCUMENTS

| | | |
|---|---|---|
| JP | 2007-043427 | 2/2007 |
| JP | 2011-193404 | 9/2011 |
| JP | 2011-234034 | 11/2011 |

OTHER PUBLICATIONS

Office Action dated Mar. 2, 2022 in Chinese Patent Application No. 202010667654.5, 6 pages.

* cited by examiner

FIG. 5A

AVERAGING FILTER

| 1 | 1 | 1 | 1 | 1 |
|---|---|---|---|---|
| 1 | 1 | 1 | 1 | 1 |
| 1 | 1 | 1 | 1 | 1 |
| 1 | 1 | 1 | 1 | 1 |
| 1 | 1 | 1 | 1 | 1 |

SMOOTHING FILTER

| 1 | 4  | 6  | 4  | 1 |
|---|----|----|----|---|
| 4 | 16 | 24 | 16 | 4 |
| 6 | 24 | 36 | 24 | 6 |
| 4 | 16 | 24 | 16 | 4 |
| 1 | 4  | 6  | 4  | 1 |

SMOOTHING FILTER

| 1 | 2 | 4  | 2 | 1 |
|---|---|----|---|---|
| 2 | 4 | 8  | 4 | 2 |
| 4 | 8 | 16 | 8 | 4 |
| 2 | 4 | 8  | 4 | 2 |
| 1 | 2 | 4  | 2 | 1 |

× 1/100

NON-LINEAR FUNCTION F

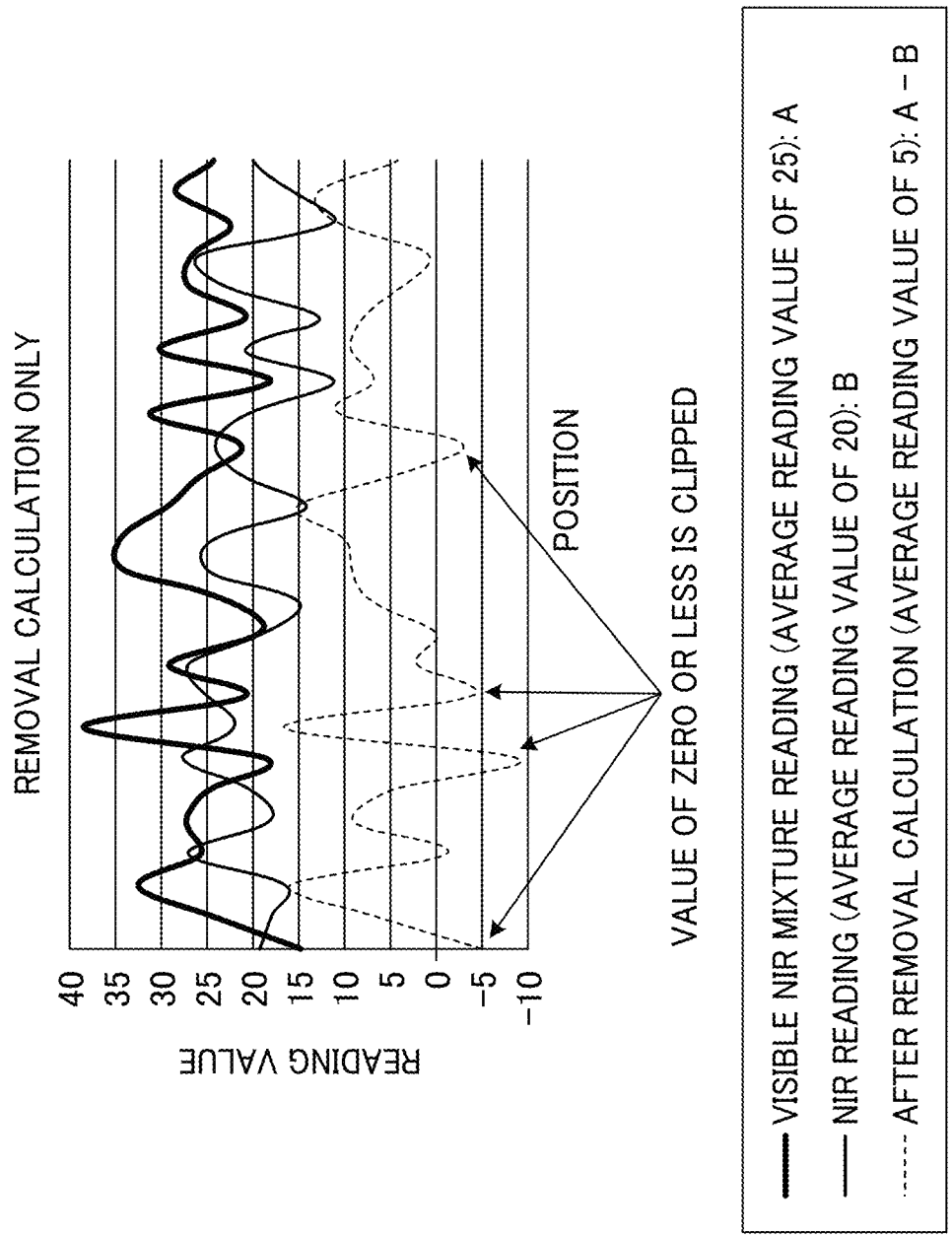

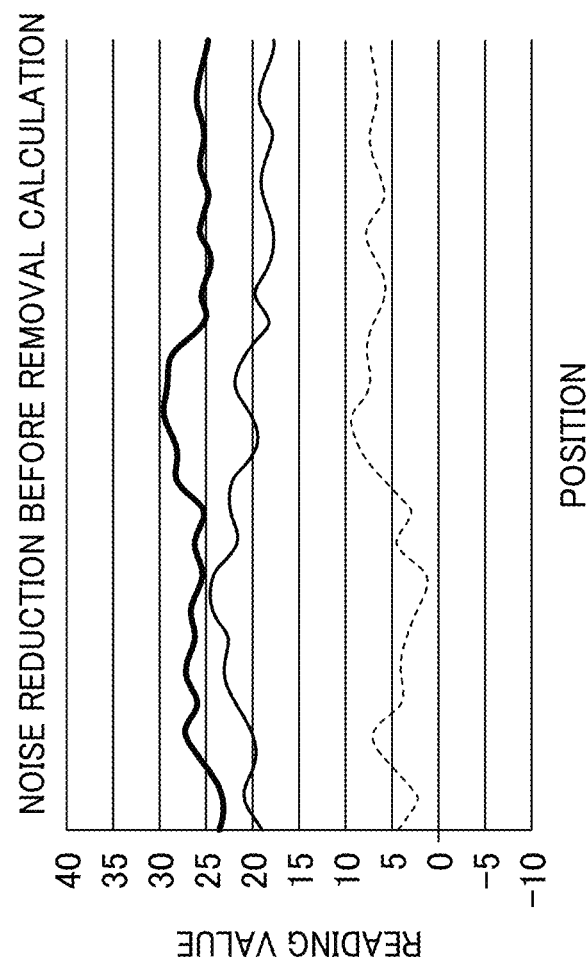

REMOVAL CALCULATION ONLY

VALUE OF ZERO OR LESS IS CLIPPED

— VISIBLE NIR MIXTURE READING (AVERAGE READING VALUE OF 25)
— NIR READING (AVERAGE READING VALUE OF 20)
----- AFTER REMOVAL CALCULATION

OFFSET + REMOVAL CALCULATION

— VISIBLE NIR MIXTURE READING (AVERAGE READING VALUE OF 25)
— NIR READING (AVERAGE READING VALUE OF 20)
----- AFTER REMOVAL CALCULATION

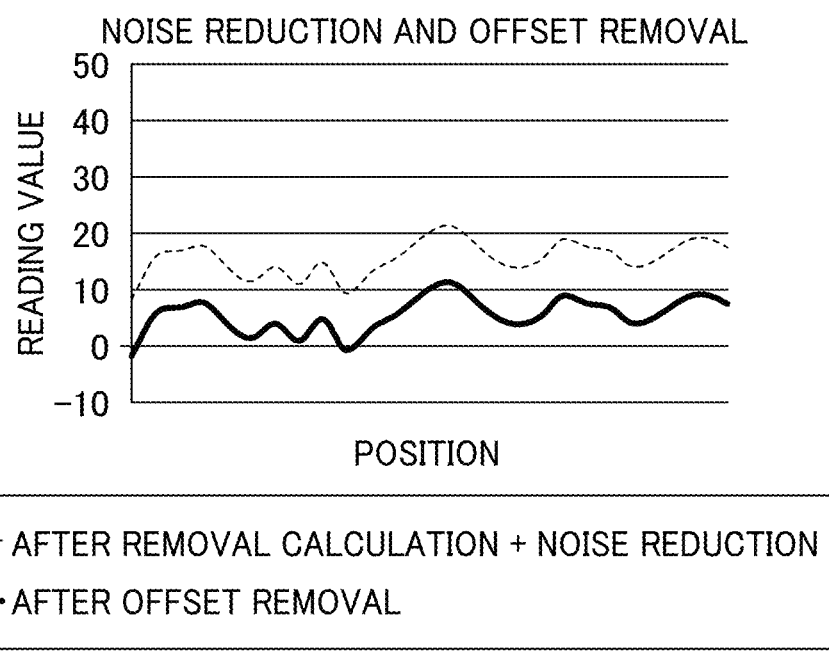

FIG. 18

| USER SETTING | CONTROL OF READER | CONTROL OF NIR COMPONENT REMOVER | |
|---|---|---|---|
| IMAGE ACQUISITION MODE | LIGHT SOURCE | REMOVAL CALCULATION | NOISE REDUCTION |
| CHARACTER DOCUMENT | VISIBLE ONLY | OFF | OFF |
| PHOTOGRAPH DOCUMENT | VISIBLE ONLY | OFF | OFF |
| CHARACTER DOCUMENT + AUTHENTICATION | VISIBLE + NIR | ON | STRENGTH A |
| PHOTOGRAPH DOCUMENT + AUTHENTICATION | VISIBLE + NIR | ON | STRENGTH B |
| AUTHENTICATION | NIR ONLY | OFF | OFF |
| SPECIAL DOCUMENT | VISIBLE ONLY | ON | STRENGTH C |

FIG. 19

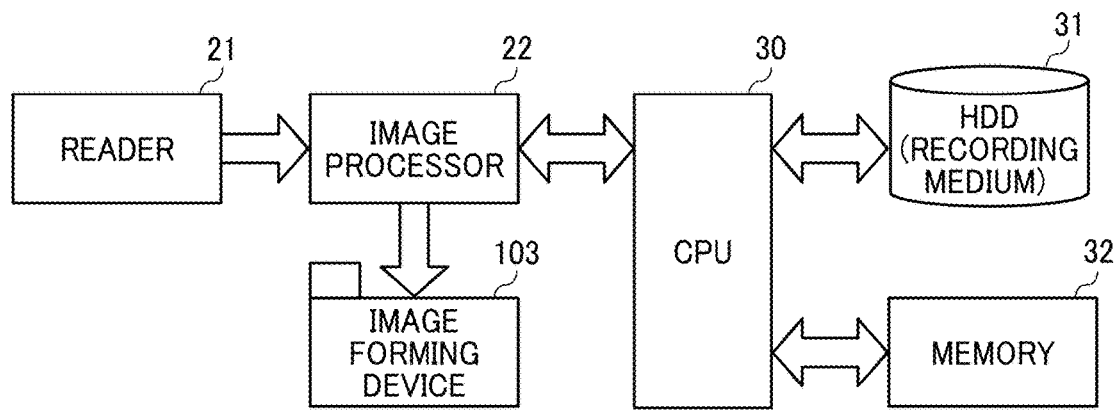

IMAGE PROCESSING APPARATUS HAVING INVISIBLE COMPONENT REMOVER, IMAGE PROCESSING METHOD, AND RECORDING MEDIUM

CROSS-REFERENCE TO RELATED APPLICATION

This patent application is based on and claims priority pursuant to 35 U.S.C. § 119 to Japanese Patent Application No. 2019-131121, filed on Jul. 16, 2019, in the Japan Patent Office, the entire disclosure of which is hereby incorporated by reference herein.

BACKGROUND

Technical Field

Exemplary aspects of the present disclosure relate to an image processing apparatus, an image processing method, and a recording medium.

Related Art

Conventionally, an image capturing technique for authenticating a document for document security is known. Such a technique embeds invisible information that cannot be seen by human eyes in a document, and reads the invisible information by using invisible light to authenticate the document.

There is a technique for extracting only a visible wavelength component by removing an infrared component from a visible image including the infrared component. According to the technique, a document image is illuminated by a lamp having an infrared wavelength component, and an infrared image including an infrared component is acquired by an infrared image sensor. At the same time, a visible image including a visible component and an infrared component is acquired by a visible image sensor. The infrared image and the visible image are used, so that the infrared component is removed from the visible image including the infrared component to extract only a visible wavelength component.

SUMMARY

In at least one embodiment of this disclosure, there is described an image processing apparatus that includes a light source, an image sensor, and an invisible component remover. The light source emits visible component light and invisible component light to a target object. The image sensor receives reflected light from the target object to detect a visible invisible mixture image including an invisible component and a visible component and an invisible image including an invisible component. The invisible component remover, based on the visible invisible mixture image and the invisible image which have been detected, removes the invisible component from the visible invisible mixture image to generate a visible image. The invisible component remover includes a removal calculator and a noise reducer. The removal calculator performs a removal calculation process of an invisible component with respect to the visible invisible mixture image. The noise reducer configured to perform a noise reduction process on at least one of an image to be input to the removal calculator and an image to be output from the removal calculator.

Further described is an improved image processing method for an image processing apparatus including a light source and an image sensor. The light source emits visible component light and invisible component light to a target object, and the image sensor receives reflected light from the target object to detect a visible invisible mixture image including an invisible component and a visible component and an invisible image including an invisible component. The image processing method includes removing, based on the visible invisible mixture image and the invisible image which have been detected, the invisible component from the visible invisible mixture image to generate a visible image. The removing includes performing a removal calculation process of an invisible component with respect to the visible invisible mixture image, and performing a noise reduction process on at least one of an image to be input to the removal calculation process and an image to be output from the removal calculation process.

Still further provided is a non-transitory computer-readable recording medium storing program code that causes a computer controlling the image processing apparatus described above to function as an invisible component remover, based on the visible invisible mixture image and the invisible image which have been detected, to remove the invisible component from the visible invisible mixture image to generate a visible image. The program code causes the invisible component remover to function as a removal calculator that performs a removal calculation process of an invisible component with respect to the visible invisible mixture image, and a noise reducer that performs a noise reduction process on at least one of an image to be input to the removal calculator and an image to be output from the removal calculator.

BRIEF DESCRIPTION OF THE DRAWINGS

The aforementioned and other aspects, features, and advantages of the present disclosure are better understood by reference to the following detailed description when considered in connection with the accompanying drawings, wherein:

FIGS. 5A, 5B, and 5C are diagrams each illustrating a noise reduction process using a linear filter:

FIGS. 7A and 7B are diagrams illustrating a noise reduction effect if noise reduction is performed prior to removal calculation;

FIGS. 12A, 12B, and 12C are diagrams each illustrating a noise reduction effect if an offset amount is provided prior to removal calculation;

FIG. 18 is a diagram illustrating examples of operation control based on mode settings; and FIG. 19 is a diagram illustrating one example of a hardware configuration including a recording medium.

Figure 1:
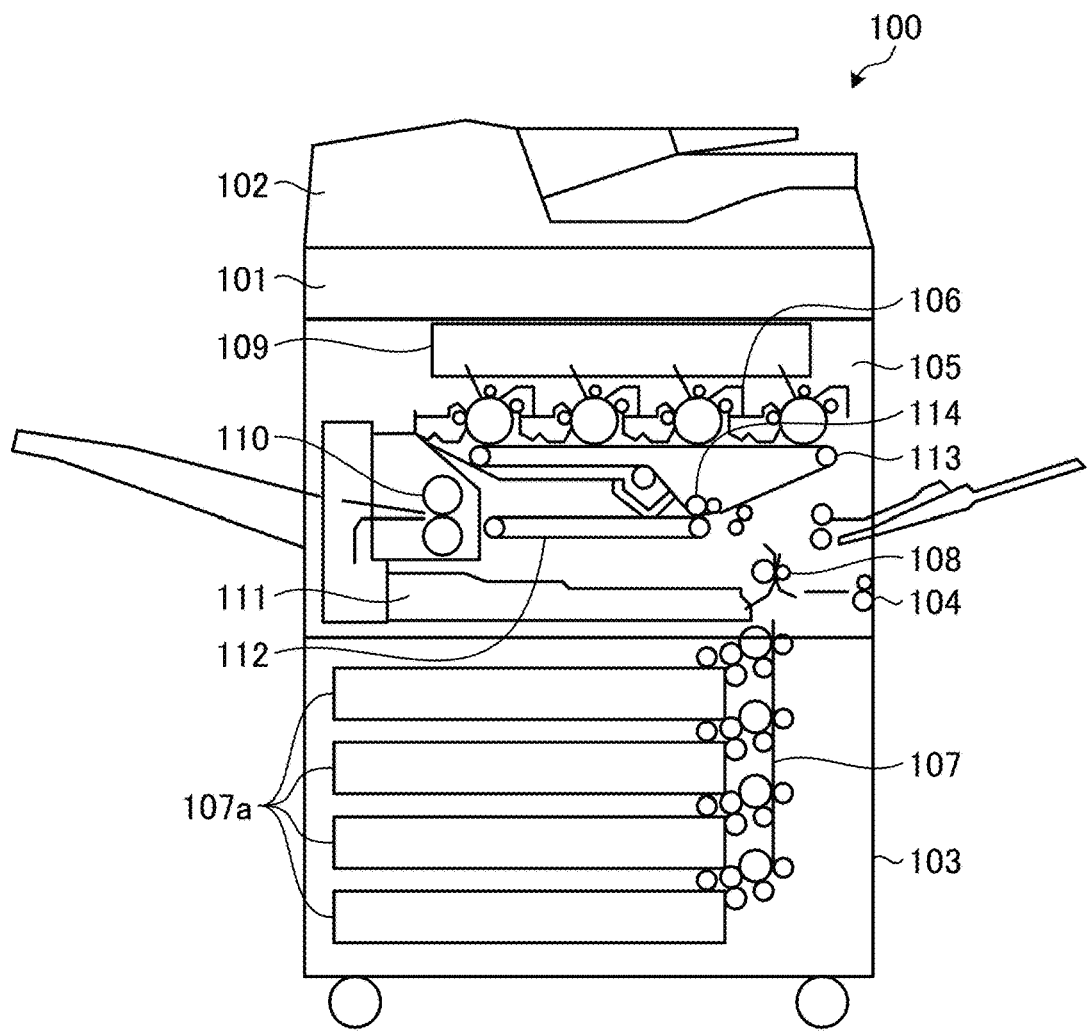
FIG. 1 is a diagram illustrating one example of an image processing apparatus according to a first embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner and achieve similar results.

Referring now to the drawings, embodiments of the present disclosure are described below. In the drawings for explaining the following embodiments, the same reference codes are allocated to elements (members or components) having the same function or shape and redundant descriptions thereof are omitted below.

An image processing apparatus, an image processing method, and a recording medium are hereinafter described in detail with reference to the drawings.

First Embodiment

FIG. 1 is a diagram illustrating one example of a configuration of an image processing apparatus 100 according to a first embodiment. The image processing apparatus 100 is an image forming apparatus generally called a multifunctional peripheral having at least two of a copy function, a print function, a scanner function, and a facsimile function.

The image processing apparatus 100 includes an image reading device 101 as a reading apparatus or an image reading apparatus, an automatic document feeder (ADF) 102, and an image forming device 103. The image forming device 103 is disposed in a lower portion of the image processing apparatus 100. In FIG. 1, the image forming device 103 without an external cover is illustrated to describe an internal configuration of the image forming device 103.

The ADF 102 is a document supporting device that feeds a document the image of which is to be read to a reading position. The ADF 102 automatically conveys the document placed on a tray to the reading position. The image reading device 101 reads the document conveyed by the ADF 102 in a predetermined reading position. On an upper surface of the image reading device 101, an exposure glass 1 as a document supporter on which a document is to be placed is disposed. The image reading device 101 reads the document on the exposure glass 1 in the reading position. Particularly, the image reading device 101 is a scanner including a light source, an optical system, and an image sensor such as a charge-coupled device (CCD) to read reflected light from a document illuminated by the light source by using the image sensor via the optical system.

The image forming device 103 prints the document image read by the image reading device 101. The image forming device 103 includes a bypass roller 104 that is used if a recording sheet is manually fed, and a recording sheet supplier 107 that supplies a recording sheet. The recording sheet supplier 107 has a mechanism for supplying recording sheets from a plurality of sheet cassettes 107a. The supplied recording sheet is fed to a secondary transfer belt 112 via a registration roller 108.

A transfer device 114 transfers a toner image on an intermediate transfer belt 113 to the recording sheet to be conveyed on the secondary transfer belt 112.

The image forming device 103 includes an optical writing device 109, a tandem image formation device 105 (for yellow (Y), magenta (M), cyan (C), and black (K)), the intermediate transfer belt 113, and the secondary transfer belt 112. An image written by the optical writing device 109 is formed as a toner image on the intermediate transfer belt 113 by an image forming process performed by the image formation device 105.

Particularly, the image formation device 105 (for Y, M, C, and K) includes four rotatable photoconductor drums (Y, M, C, and K). An image formation element 106 including a charging roller, a developing device, a primary transfer roller, a cleaner, and a discharger is disposed around each of the photoconductor drums. The image formation elements 106 function at the respective photoconductor drums, so that images on the photoconductor drums are transferred to the intermediate transfer belt 113 by the respective primary transfer rollers.

The intermediate transfer belt 113 is disposed in nips between the photoconductor drums and the respective primary transfer rollers and extends across a drive roller and a driven roller. With movement of the intermediate transfer belt 113, a toner image primarily transferred to the intermediate transfer belt 113 is secondarily transferred to a recording sheet on the secondary transfer belt 112 by a secondary transfer device. Such a recording sheet is conveyed to a fixing device 110 by movement of the secondary transfer belt 112, and the toner image is fixed as a color image on the recording sheet. Subsequently, the recording sheet is ejected to an ejection tray disposed outside the image forming device 103. If duplex printing is performed, a front surface and a back surface of the recording sheet are reversed by a reverse device 111 and the reversed recording sheet is fed to the secondary transfer belt 112.

The present embodiment has been described using a case in which the image forming device 103 employing the electrophotographic method forms an image as described above. However, the present embodiment is not limited to the electrophotographic image forming device. An image forming device employing an inkjet method can form an image.

Next, the image reading device 101 is described.

Figure 2:
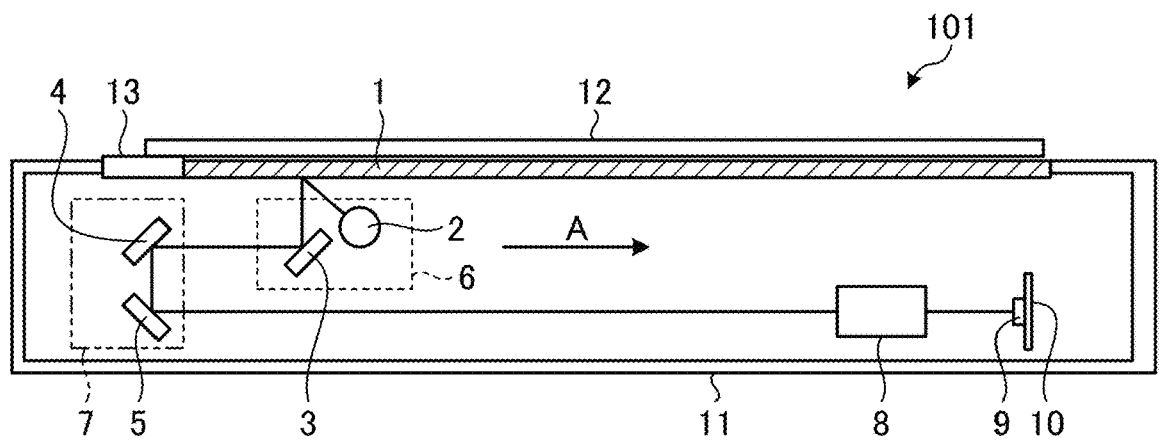
FIG. 2 is a sectional view illustrating an example of a structure of an image reading device.

FIG. 2 is a sectional view illustrating an example of a structure of the image reading device 101. As illustrated in FIG. 2, the image reading device 101 includes a sensor board 10 with an image sensor 9 as an image capturing element, a lens device 8, a first carriage 6, and a second carriage 7 that are arranged in a body 11. The image sensor 9 is, for example, a CCD image sensor or a complementary metaloxide-semiconductor (CMOS) image sensor. The first carriage 6 includes a light source 2 that is a light emitting diode (LED), and a mirror 3. The light source 2 includes mirrors 4 and 5. In addition, the exposure glass 1 and a reference white board 13 are arranged on the upper surface of the image reading device 101.

In a reading operation, the image reading device 101 emits light upward from the light source 2 while moving the first carriage 6 and the second carriage 7 in a sub-scanning direction (a direction indicated by an arrow A shown in FIG. 2) from standby positions (home positions). Then, the first carriage 6 and the second carriage 7 cause reflected light from a document 12 to form an image on the image sensor 9 via the lens device 8.

Moreover, the image reading device 101 reads reflected light from the reference white board 13 to set a reference, for example, when the power is turned on. That is, the image reading device 101 moves the first carriage 6 to a location immediately below the reference white board 13, and turns on the light source 2 to cause reflected light from the reference white board 13 to form an image on the image sensor 9, thereby performing gain adjustment.

Figure 3:
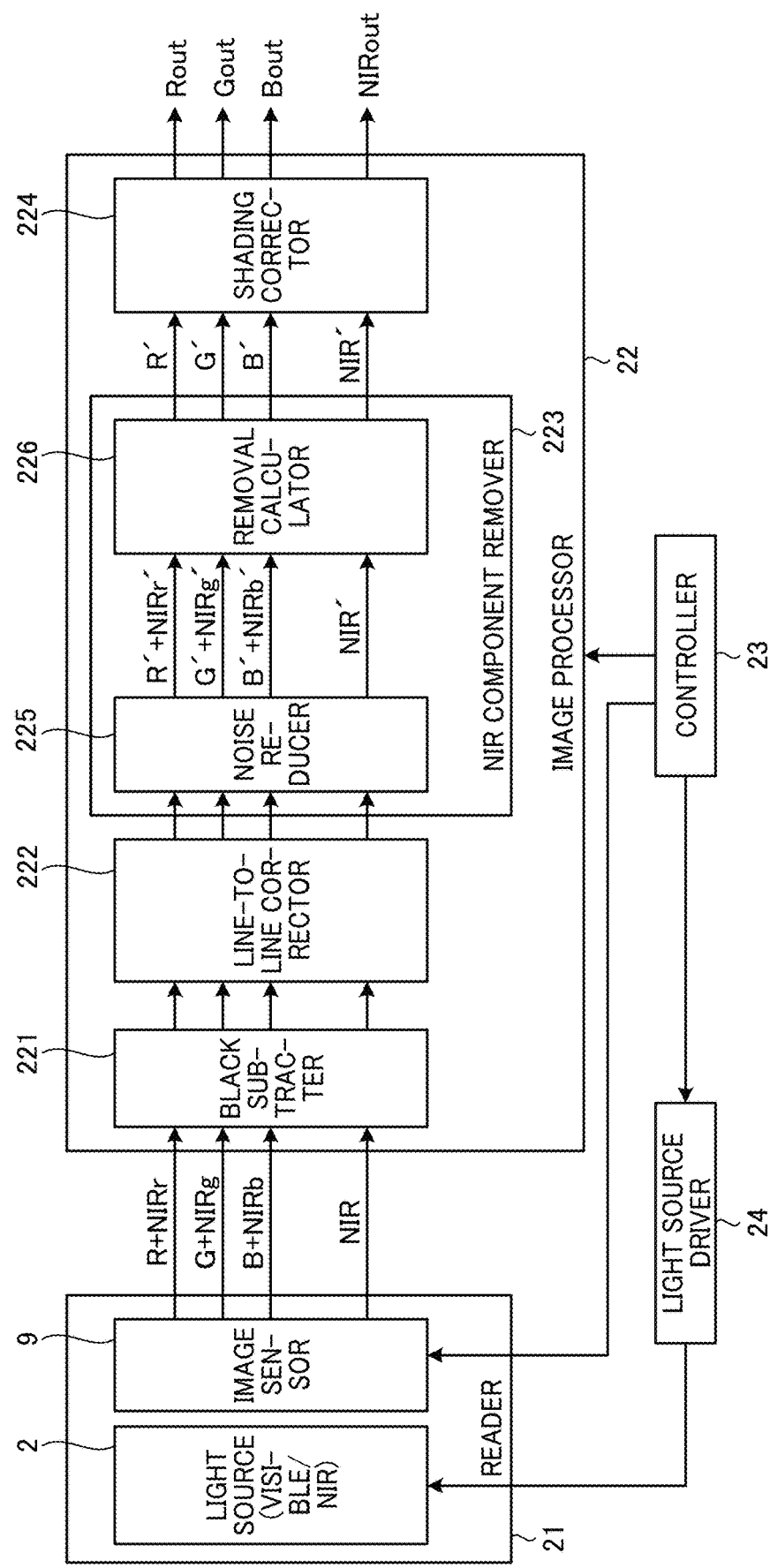
FIG. 3 is a block diagram illustrating an electric connection of each component of the image reading device.

FIG. 3 is a block diagram illustrating an electric connection of each component of the image reading device 101. As illustrated in FIG. 3, the image reading device 101 includes a reader 21, an image processor 22, a controller 23 as control circuitry, and a light source driver 24.

The reader 21 includes the image sensor 9 and the light source 2 including visible component light and NIR component light that is invisible component light. The reader 21 irradiates a document with the visible component light and the NIR component light.

The light source driver 24 drives the light source 2.

The image sensor 9 acquires a visible invisible mixture image (a visible NIR mixture image) including a visible component and a NIR component (an invisible component), and a NIR image (an invisible image) including a NIR component based on reflected light from the document, and outputs the acquired images to the image processor 22 disposed in the following stage. In visible image reading, the image sensor 9 outputs red, green, and blue (RGB) signals. In invisible image reading, the image sensor 9 outputs a NIR signal. A general image sensor includes a color filter characterized in that NIR light is transmitted through the color filter. Hence, in invisible image reading, the NIR signal appears in each of RGB outputs (NIRr, NIRg, and NIRb).

In the present embodiment, an example in which a NIR image is used as an invisible image is described. However, an ultraviolet image can be used as an invisible image, and a wavelength region to be used for the invisible image is not particularly limited to any one region.

The controller 23 controls each of the light source driver 24, the image sensor 9, and the image processor 22.

The image processor 22 includes a black subtracter 221, a line-to-line corrector 222, a NIR component remover 223, and a shading corrector 224.

The black subtracter 221 performs black level correction on a visible NIR mixture image and a NIR image output from the image sensor 9.

The line-to-line corrector 222 performs a line-to-line correction process by which physical displacement of a line of the image sensor 9 is corrected.

The NIR component remover 223 functioning as an invisible component remover removes a NIR component (an invisible component) from a visible NIR mixture image (a visible invisible mixture image) to generate a visible image that does not include the NIR component. A detailed description of the NIR component remover 223 will be given below.

The shading corrector 224 functioning as an image corrector performs shading correction on each of the NIR image and the visible image with the NIR component removed. In the shading correction, a reading level of a white background plate is maintained for each main scanning pixel, and document read data is standardized at the reading level of the white background plate, so that fluctuations in reading level in a main scanning direction are removed.

The NIR component remover 223 is described in detail.

Figure 4:
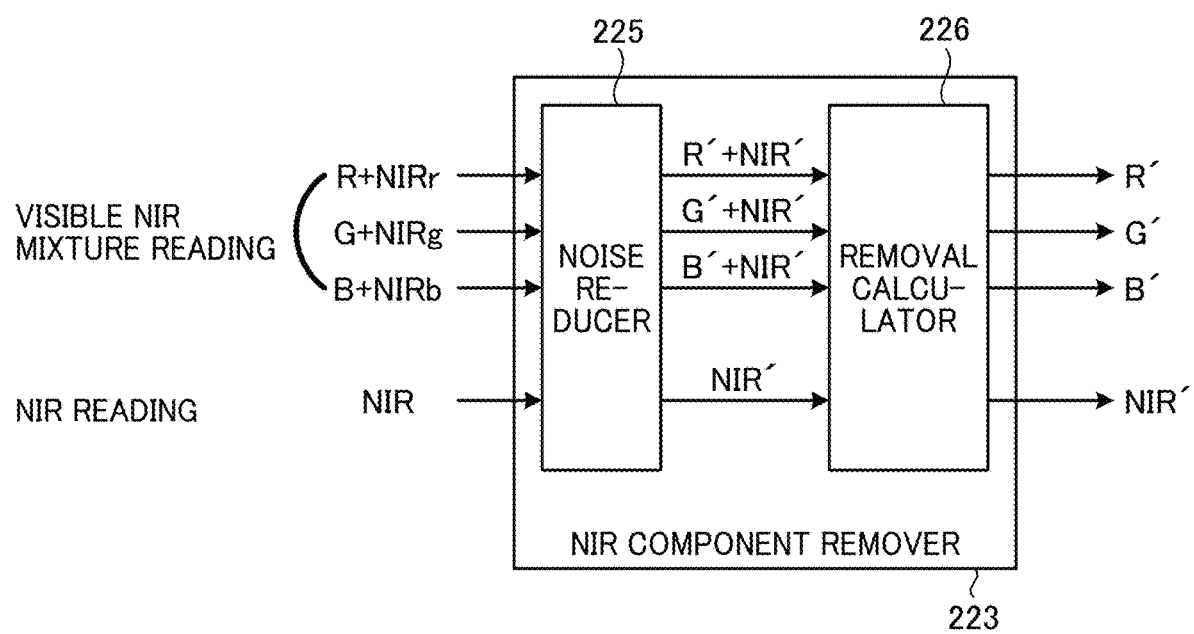
FIG. 4 is a block diagram illustrating a configuration of a near infrared (NIR) component remover.

FIG. 4 is a block diagram illustrating a configuration of the NIR component remover 223. As illustrated in FIG. 4, the NIR component remover 223 receives the visible NIR mixture image and the NIR image acquired by the image sensor 9. The NIR component remover 223 includes a noise reducer 225 and a removal calculator 226.

The noise reducer 225 performs a noise reduction process on each of the visible NIR mixture image and the NIR image which have been input.

The removal calculator 226 uses the visible NIR mixture image and the NIR image which have undergone the noise reduction to remove a NIR component from the visible NIR mixture image.

Examples of removal calculation equations to be used by the removal calculator 226 are as follows.

$$Rout = Rin - NIR \times Kr$$

$$Gout = Gin - NIR \times Kg$$

$$Bout = Bin - NIR \times Kb$$

In the equations, where Rin, Gin, and Bin are image signals that have been input to the removal calculator 226.

The image signals (Rin, Gin, and Bin) represent images in which visible components and NIR components are mixed. The removal calculator 226 subtracts NIR signals from the input image signals (Rin, Gin, and Bin) to output images having only visible components. Moreover, the removal calculator 226 multiplies a NIR signal by different coefficients Kr, Kg, and Kb on a channel basis. Such multiplication corrects a difference of the NIR components for each channel due to characteristics of the color filter disposed in the image sensor 9.

Generally, addition and subtraction of images each having noise superimposes noise. That is, a root-sum-square value of noise amount $\sigma 1$ of a visible NIR mixture image to be input and a noise amount $\sigma 2$ of a NIR image to be input is a noise amount $\sigma 3$ of a visible image to be output.

$$\sigma 3 = \sqrt{(\sigma 1^2 + \sigma 2^2)}$$

The noise amount of the visible image to be output by such calculation is greater than a noise amount of a visible image including only a visible component optically acquired by an element such as an infrared cut filter.

In the present embodiment, the noise reducer 225 disposed in a stage preceding the removal calculator 226 reduces noise prior to removal of the NIR component. Such noise reduction lowers noise amounts $\sigma 1$ and $\sigma 2$ beforehand, and thus a noise amount $\sigma 3$ of an output visible image can be lowered. Accordingly, the noise reduction process prior to the removal calculation enables the removal calculator 226 to perform NIR component removal calculation on the noise-reduced image. Therefore, noise influence can be reduced, and output image quality can be maintained.

Next, a noise reduction method performed by the noise reducer 225 is described.

First, an example in which a linear filter is used as a noise reduction method is described.

FIGS. 5A, 5B, and 5C are diagrams each illustrating a noise reduction process using a linear filter. The linear filter represents a filter such as an averaging filter as illustrated in FIG. 5A and a smoothing filter as illustrated in each of FIGS. 5B and 5C. The linear filter assigns weights to peripheral pixel values with respect to a target pixel, and performs convolution calculation.

As for the smoothing filter, filter strength can vary depending on a coefficient setting. However, the filter coefficient does not vary depending on a pixel position or a pixel value, and the same weighting calculation is performed on the entire area. Since a complicated process is not necessary, the use of the smoothing filter enables a noise reduction process to be performed with small circuit scale.

Accordingly, the noise reducer 225 executes a filter process using a linear filter. Thus, noise can be reduced by a simple process and roughness degradation can be prevented.

Next, an example in which a non-linear filter is used as a noise reduction method is described.

Figure 6:
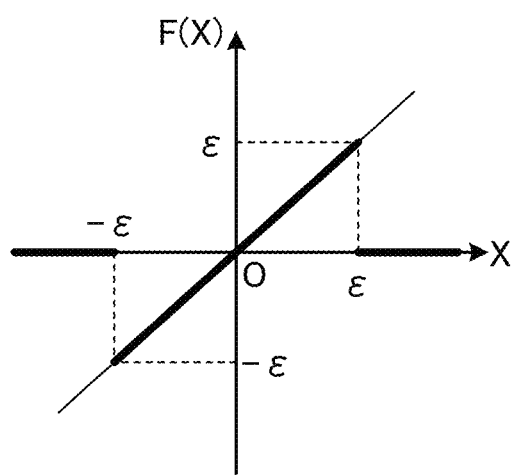
FIG. 6 is a diagram illustrating a noise reduction process using a non-linear filter.

FIG. 6 is a diagram illustrating a noise reduction process using a non-linear filter. Herein, an epsilon filter is described as an example. The epsilon filter is expressed by Equation 1. An output y (n) is a value determined by adding a value determined from a coefficient $a_k$ and a non-linear function F to an input x (n).

$$y(n) = x(n) + \sum_{k=-N}^{N} a_k F(x(n-k) - x(n))$$ [Equation 1]

In the non-linear function F illustrated in FIG. 6, x (n−K)−x (n) is a difference between an input pixel value and a value of a pixel that is a certain distance away from an input pixel, and the difference is used as an input. If an absolute value of the difference is greater than the epsilon, a value "0" is set. If the absolute value of the difference is smaller than the epsilon, a value of such a difference is repeated in the function. That is, since a pixel having a large pixel value is excluded from a weighting calculation target, the epsilon filter can serve as a smoothing filter by which noise can be reduced without edge degradation.

The non-linear filter is not limited to the epsilon filter. A non-linear filter such as a bilateral filter can be used for noise reduction.

Accordingly, the noise reducer 225 performs a filter process using a non-linear filter to perform a noise reduction process in a state in which an edge is preserved, thereby preventing roughness degradation while reducing degradation in resolving power.

Next, an effect of noise reduction prior to removal calculation performed by the removal calculator 226 is described.

FIGS. 7A and 7B are diagrams illustrating a noise reduction effect if noise reduction is performed prior to removal calculation. Each of FIGS. 7A and 7B illustrates a change in a reading value acquired by reading an image having a certain pixel value.

FIG. 7A illustrates a reading value and a removal calculation result if only removal calculation is executed. In FIG. 7A, a thick line represents data having an average reading value of 25 on the assumption that visible NIR mixture reading is performed, and a thin line represents data having an average reading value of 20 on the assumption that NIR reading is performed. In FIG. 7A, a dotted line represents a result of removal calculation based on a visible NIR mixture image and a NIR image.

As illustrated in FIG. 7A, since read data has a noise component, a reading value is not constant and fluctuates depending on a position. As illustrated in the removal calculation result in such a state in which noise is added, a reading value can be zero or less depending on a position. In a state in which a bit width is held constant, since a reading value of zero or less is clipped, a reading value is greater on average than a pixel value to be originally used. Consequently, color reproduction is degraded.

FIG. 7B illustrates a reading value and a removal calculation result if noise reduction is performed prior to removal calculation. As illustrated in FIG. 7B, if noise is reduced prior to removal calculation, fluctuations in the reading values are reduced, and the number of pixels to be clipped is reduced. Hence, a NIR component can be removed with color reproduction having higher accuracy without addition of a bit of negative expression.

On the other hand, smoothing filters (linear filters) as illustrated in FIGS. 5B and 5C may be used with different strength for a visible NIR mixture image and a NIR image, or an epsilon filter (a non-linear filter) in which a process is changed for each pixel as described in Equation 1 may be used. In such a case, since each of a NIR component in the visible NIR mixture image and a NIR component in the NIR image changes, removal calculation by coefficient calculation is not enough to remove an appropriate NIR component from the visible NIR mixture image. In such a case, thus, a process to be performed by the removal calculator 226 needs to be switched in a complicated manner such that a filter characteristic in the noise reducer 225 in a stage preceding the removal calculator 226 is absorbed.

Accordingly, in the present embodiment, the noise reducer 225 preferably uses linear filters having same strength for a visible NIR mixture image and a NIR image at noise reduction. The use of such filters enables a NIR component to be appropriately removed from the visible NIR mixture image even if a process to be performed by the removal calculator 226 is simplified.

Hence, the use of linear filters having the same strength for a visible NIR mixture image and a NIR image can prevent inconsistency of invisible components included in the visible NIR mixture image and the NIR image at removal calculation.

Next, determination of noise reduction strength in the noise reducer 225 is described.

Figure 8:
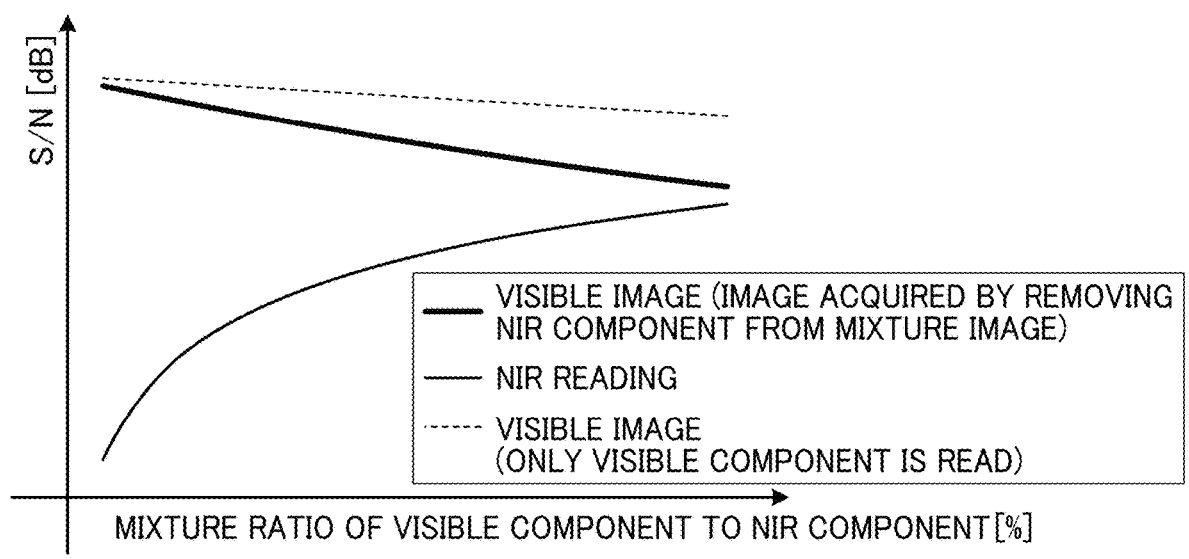
FIG. 8 is a diagram illustrating determination of noise reduction strength based on a component ratio of visible components to NIR components.

FIG. 8 is a diagram illustrating determination of noise reduction strength based on a component ratio of visible components to NIR components. In FIG. 8, a change in signal to noise (S/N) ratio of each image with respect to a mixture ratio of visible components to NIR components is illustrated. In FIG. 8, a thin solid line indicates a change in S/N ratio of a NIR image, and a thick solid line indicates a change in S/N ratio of a visible image that is acquired by removing a NIR component from a visible NIR mixture image by using a NIR image. A dotted line indicates a change in S/N ratio of a visible image.

As illustrated in FIG. 8, if a ratio of the NIR component is increased, a NIR signal level increases and the S/N ratio increases. If a ratio of the NIR component is increased, the S/N ratio decreases since visible components are reduced. In addition, removal of the NIR component degrades the S/N ratio (a larger decrease than a decreases in the S/N ratio if only visible components are acquired).

Accordingly, an S/N ratio subsequent to visible image generation can be estimated from a mixture ratio of visible components to NIR components. Thus, a change in noise reduction strength based on the mixture ratio can simply adjust the S/N ratio to a target S/N ratio.

According to the present embodiment, when an invisible component included in a visible image is to be removed, an increase in noise to be generated at the removal of the invisible component can be prevented, and image quality degradation can be prevented or reduced.

According to the present embodiment, moreover, execution of a noise reduction process prior to a removal calculation process can prevent or reduce a computing error at the time of removal calculation.

Second Embodiment

A second embodiment is described.

The second embodiment differs from the first embodiment in that a noise reducer 225 is disposed in a stage following a removal calculator 226. The first embodiment has been described using an example in which a noise reduction process is performed prior to the process performed by the removal calculator 226. However, a noise reduction process can be performed on an output visible image from the removal calculator 226 to reduce a noise amount σ3 of the output visible image. Hereinafter, components and configurations that differ from components and configurations of the first embodiment will be described, and description of like components will be omitted.

Figure 9:
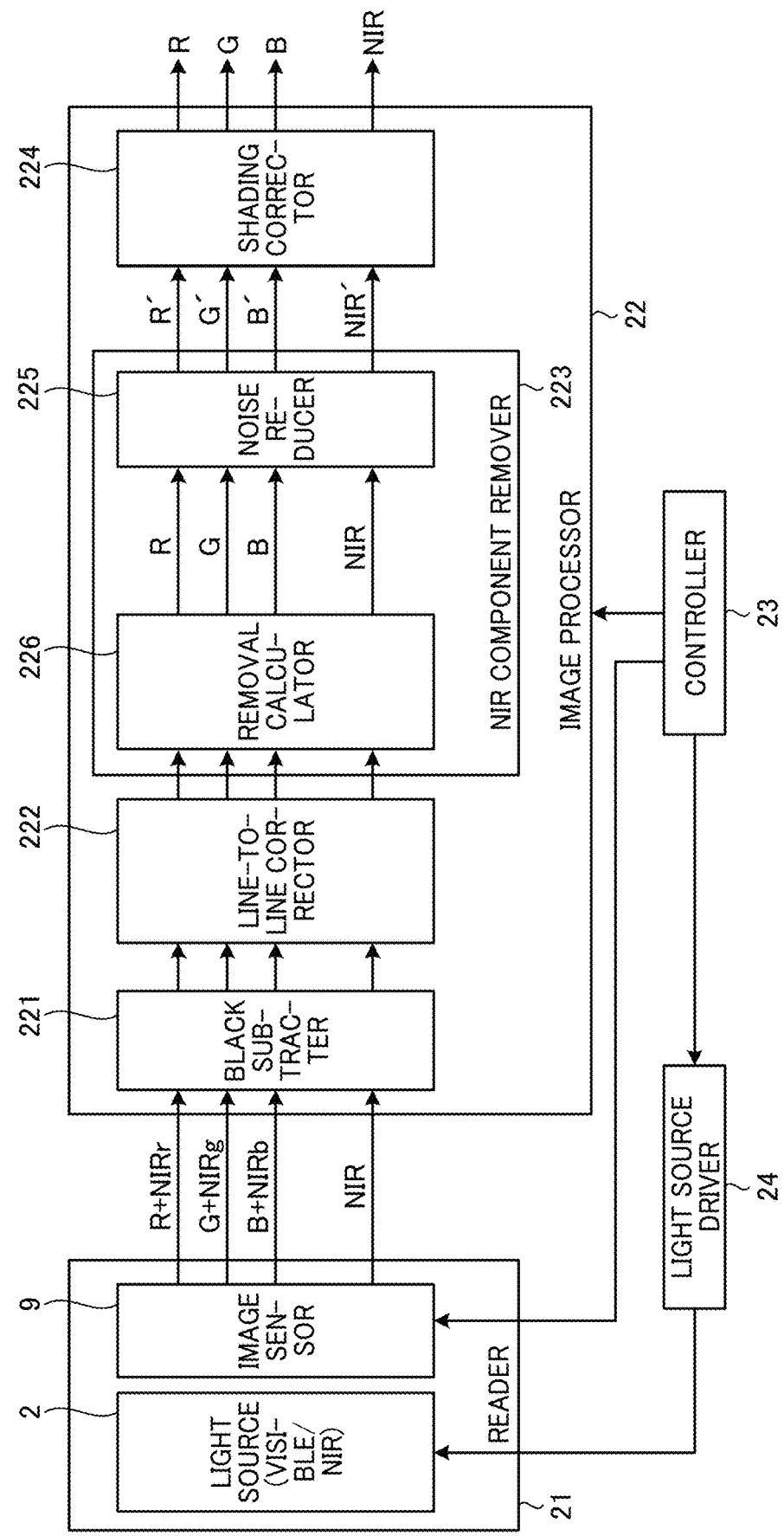
FIG. 9 is a block diagram illustrating an electric connection of each component of an image reading device according to a second embodiment.

FIG. 9 is a block diagram illustrating an electric connection of each component of an image reading device 101 according to the second embodiment. As illustrated in FIG. 9, the image reading device 101 includes a reader 21 and an image processor 22.

The image processor 22 includes a black subtracter 221, a line-to-line corrector 222, a NIR component remover 223, and a shading corrector 224.

Unlike the NIR component remover 223 described in the first embodiment, the NIR component remover 223 of the present embodiment includes the noise reducer 225 in a stage following the removal calculator 226. That is, the NIR component remover 223 first performs removal calculation in the removal calculator 226 by using a NIR image and a visible NIR mixture image that are output from the line-to-line corrector 222 as inputs. Then, the NIR component remover 223 performs a noise reduction process in the noise reducer 225 on the visible image and the NIR image output from the removal calculator 226. Such a configuration can enhance image quality of the NIR image originally having a small signal level while enhancing image quality of the visible image on which noise has been superimposed by the removal calculation.

In addition, a relation between a NIR component included in the visible NIR mixture image and a NIR component included in the NIR image needs to be clear (preferably match each other) to remove the NIR component from the visible NIR mixture image with good accuracy.

In a case where noise reduction is performed prior to the removal calculation as described in the first embodiment, a relation between the noise reduction and the removal calculation may be affected depending on a noise reduction method. However, if noise reduction is performed subsequent to removal calculation, any noise reduction method can be applied as the noise reduction is performed on an image that has undergone the removal calculation.

Moreover, since a non-linear filter as described in Equation 1 can be aggressively used so that the accuracy of the NIR component removal calculation is not affected by a noise reduction method, noise can be reduced while degradation in sharpness of characters and lines can be being prevented or reduced. Hence, image quality can be more enhanced.

According to the present embodiment, a noise reduction process is performed subsequent to the process performed by the removal calculator 226, and thus various noise reduction methods can be applied without consideration of influence on the removal calculation process.

According to the present embodiment, moreover, the use of a non-linear filter in a process subsequent to the process performed by the removal calculator 226 can not only maintain resolving power but also prevent roughness degradation due to noise without consideration of influence on the removal calculation.

Figure 10:
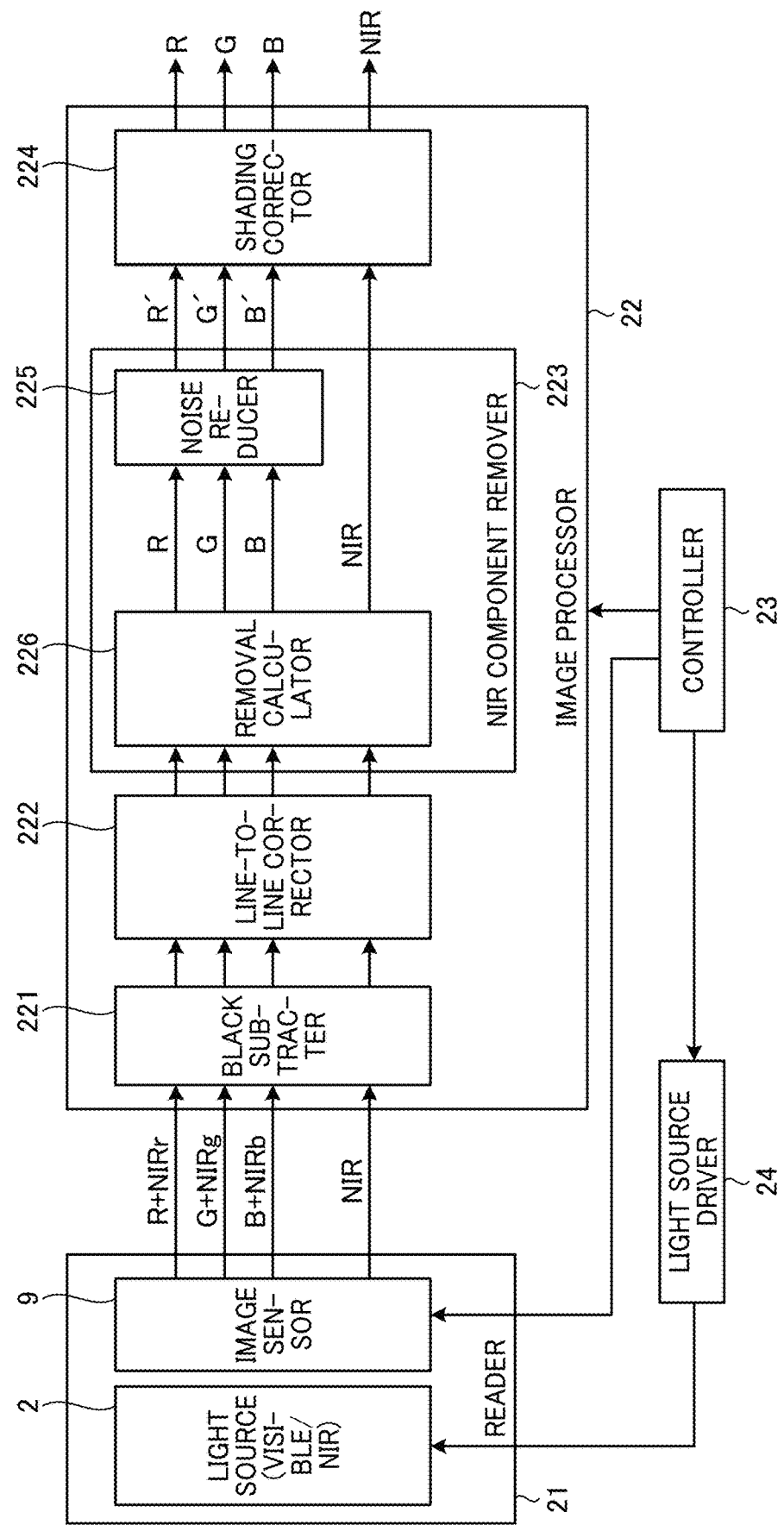
FIG. 10 is a block diagram illustrating a modification of the image reading device.

FIG. 10 is a block diagram illustrating a modification of the image reading device 101. As illustrated in FIG. 10, the NIR component remover 223 can limit noise reduction to be performed by the noise reducer 225 in a stage following the removal calculator 226 to a visible image. In a NIR image, since noise is not degraded by removal calculation, a noise reduction process may be unnecessary if the NIR image has adequate quality for a usage scene. Such a configuration can reduce circuit scale for the noise reduction process.

Third Embodiment

A third embodiment is described.

The third embodiment differs from the first and second embodiments in that an offsetter 227 that performs an offset process for providing an offset amount to a visible NIR mixture image is disposed. Hereinafter, components and configurations that differ from components and configurations of the first and second embodiments will be described, and description of like components will be omitted.

Figure 11:
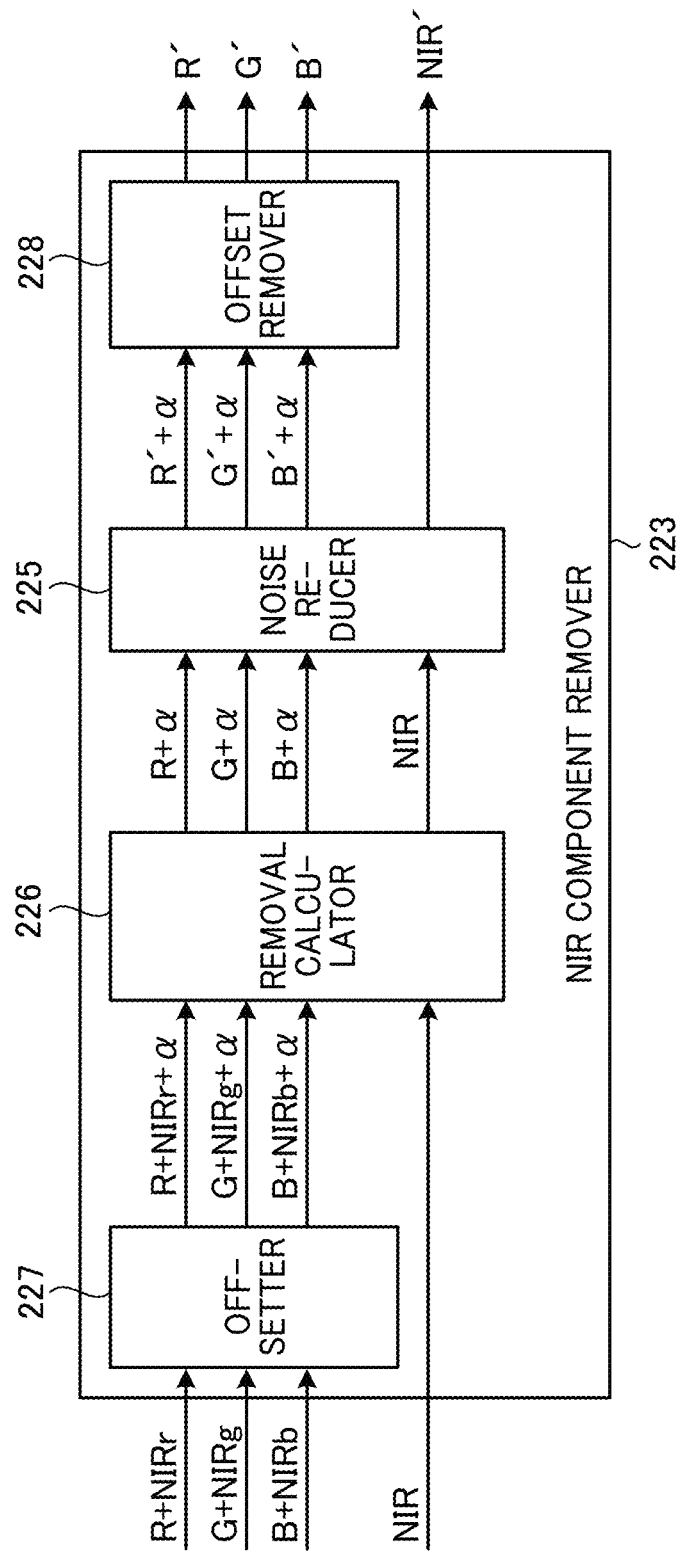
FIG. 11 is a block diagram illustrating a configuration of a NIR component remover according to a third embodiment.

FIG. 11 is a block diagram illustrating a configuration of a NIR component remover 223 according to the third embodiment. As illustrated in FIG. 11, the NIR component remover 223 receives a visible NIR mixture image and a NIR image acquired by an image sensor 9.

As described in FIGS. 7A and 7B, read data includes a noise component. If NIR removal calculation is performed on a visible NIR mixture image without noise reduction, a value of zero or less is clipped. Such a situation may degrade color reproduction.

In the present embodiment, the NIR component remover 223 includes the offsetter 227 and an offset remover 228 in addition to a noise reducer 225 and a removal calculator 226.

The offsetter 227 provides an offset amount to a visible NIR mixture image.

The offset remover 228 removes the offset amount provided by the offsetter 227 subsequent to removal calculation and noise reduction.

Next, a description is given of a noise reduction effect if an offset amount is proved prior to a process performed by the removal calculator 226.

Figure 12A:
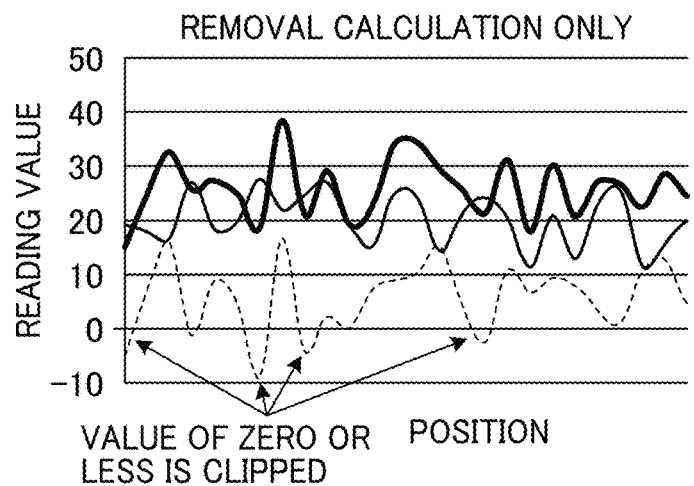
Figure 12B:
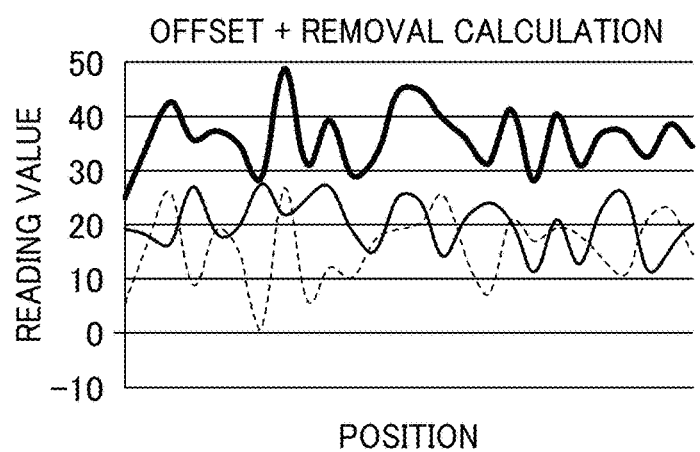

FIGS. 12A, 12B, and 12C are diagrams illustrating a noise reduction effect if an offset amount is provided prior to removal calculation. Each of FIGS. 12A. 12B, and 12C illustrates a change in a reading value acquired by reading an image having a certain pixel value.

FIG. 12A illustrates a reading value and a removal calculation result if only removal calculation is performed, and FIG. 12A is substantially the same as FIG. 7A. Since each of a visible NIR mixture image and a NIR image is data having noise, a pixel level has a positive value on average. However, a pixel having a value of zero or less is present subsequent to removal calculation. Each of such pixels is clipped to zero unless a bit with is expanded.

FIG. 12B illustrates a reading value and a removal calculation result if an offset value is provided prior to removal calculation. As illustrated in FIG. 12B, the offsetter 227 provides an offset amount to only a visible NIR mixture image to offset data to be a removal calculation source, so that a value subsequent to the removal calculation can be prevented from being zero or less.

FIG. 12C illustrates an example in which an offset amount is removed after noise reduction is performed on data subsequent to removal calculation. As illustrated in FIG. 12C, an offset amount is provided by the offsetter 227 and then removal calculation is performed. In addition, after noise reduction, the offset amount is removed by the offset remover 228. Thus, a value of zero or less can be prevented.

Accordingly, even if the noise reducer 225 performs the noise reduction using a non-linear filter subsequent to the removal calculation, the number of pixels to be clipped at zero is reduced, and a NIR component can be removed with color reproduction having higher accuracy without addition of a bit of negative expression.

Next, determination of an offset amount by the offsetter 227 is described.

Figure 13A:
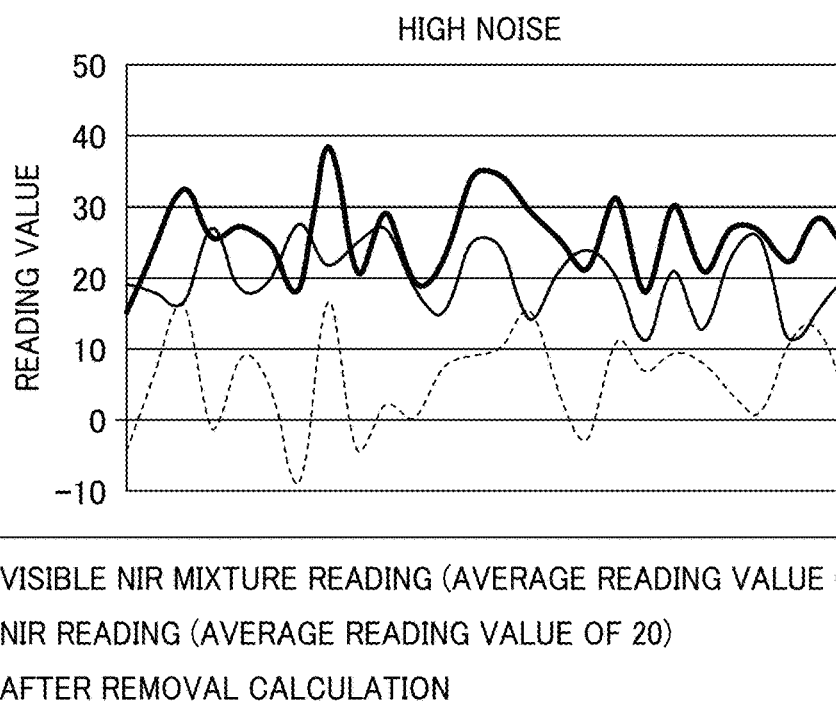
FIGS. 13A and 13B are diagrams illustrating noise reduction effects if noise is high and noise is low, respectively.
Figure 13B:
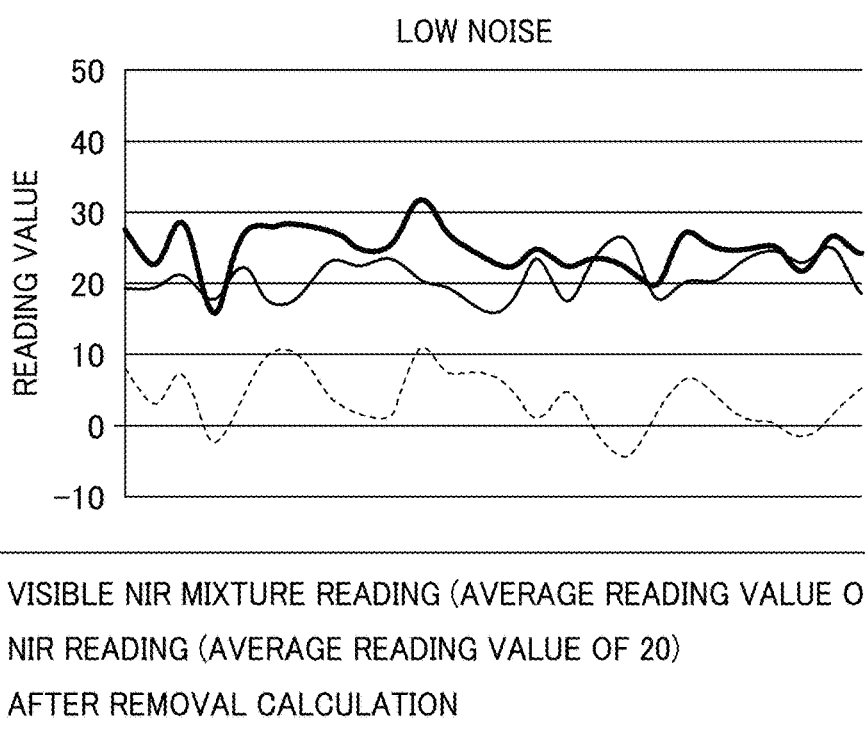

FIGS. 13A and 13B are diagrams illustrating noise reduction effects that are respectively exerted if noise is high and noise is low. FIG. 13A illustrates a case where noise is high, and FIG. 13A is substantially the same as FIG. 7A. FIG. 13B illustrates a case where noise is low.

As illustrated in FIGS. 13A and 13B, fluctuations in reading values of both the visible NIR mixture image and the NIR image are greater where noise is high in FIG. 13A than where noise is low in FIG. 13B. Moreover, since noise is higher in FIG. 13A, the number of values that are zero or less or the number of positions that are zero or less subsequent to the removal calculation is greater.

Accordingly, an offset amount to be provided in the visible NIR mixture image reading illustrated in FIG. 13A needs to be greater than an offset amount to be provided in the visible NIR mixture image reading illustrated in FIG. 13B. On the other hand, if noise is low as illustrated in FIG. 13B, an offset amount to be provided by the offsetter 227 is desirably small. A reading value that may be zero or less becomes color close to zero.

The greater the offset amount, the lower the possibility of zero clipping in a pixel having a reading value close to zero. However, an overflow may occur in a larger reading value. In the present embodiment, the offsetter 227 sets an offset amount to an appropriate value according to an amount of noise of the image reading device 101, so that a suitable value can be set to the image reading device 101.

According to the present embodiment, execution of an offset process can reduce a calculation error that occurs when the removal calculator 226 performs removal calculation. Moreover, the use of a suitable offset amount can prevent an overflow in a larger reading value.

Fourth Embodiment

A fourth embodiment is described.

The fourth embodiment differs from the first through third embodiments in that noise reduction is performed subsequent to image correction (e.g., subsequent to shading correction). Hereinafter, components and configurations that differ from components and configurations of the first thorough third embodiments will be described, and description of like components will be omitted.

Figure 14:
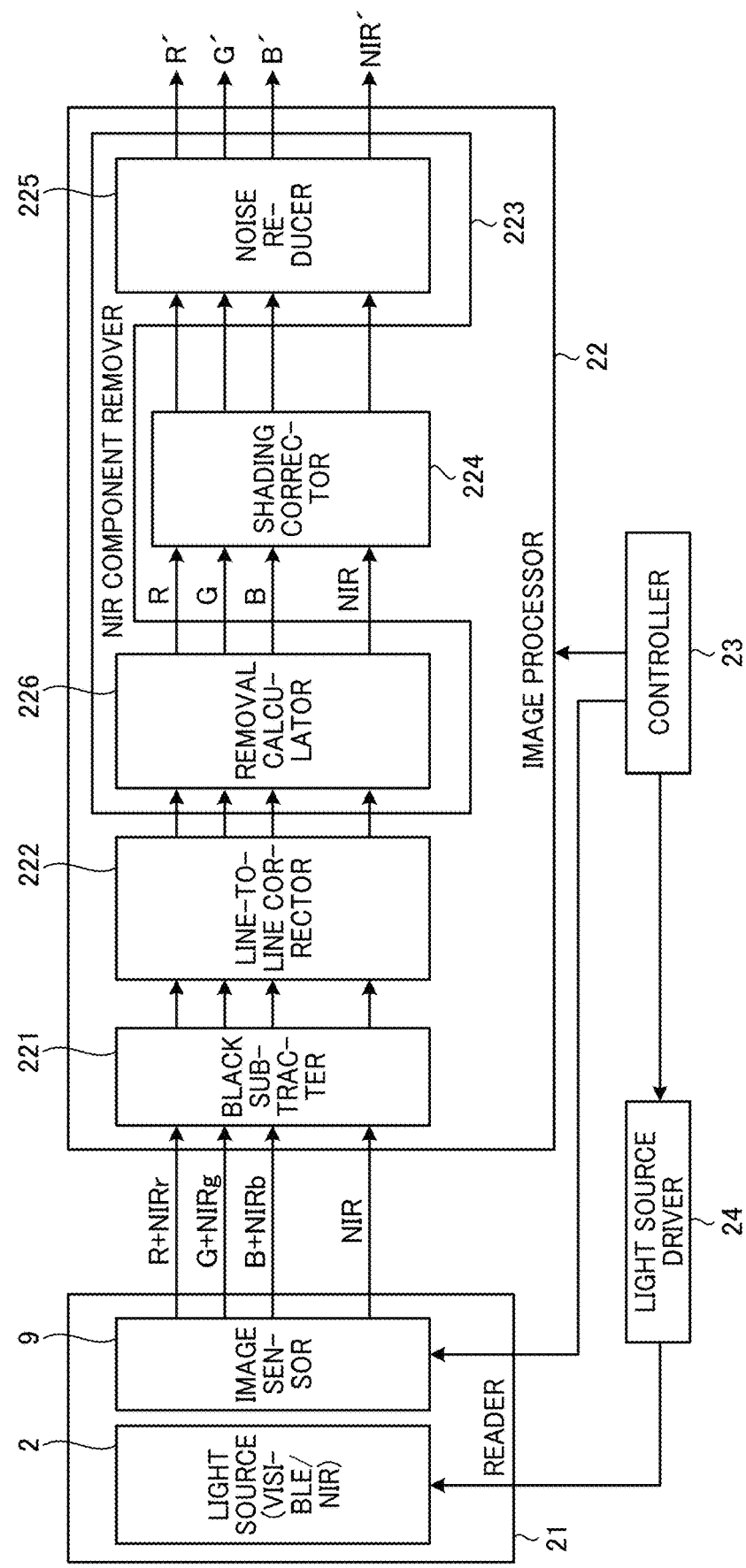
FIG. 14 is a block diagram illustrating an electric connection of each component of an image reading device according to a fourth embodiment.

FIG. 14 is a block diagram illustrating an electric connection of each component of an image reading device 101 according to the fourth embodiment. As illustrated in FIG. 14, the image reading device 101 includes a reader 21 and an image processor 22.

The image processor 22 includes a black subtracter 221, a line-to-line corrector 222, a NIR component remover 223, and a shading corrector 224. In the present embodiment, shading correction is described as image correction. However, the image correction is not limited to the shading correction.

Unlike the NIR component remover 223 described in each of the first through third embodiments, the NIR component remover 223 of the present embodiment includes a removal calculator 226 and a noise reducer 225 that are respectively arranged in stages preceding and following the shading corrector 224.

As described above in the first embodiment, in the shading correction, a reading level of a white background plate is maintained for each main scanning pixel, and document read data is standardized at the reading level of the white background plate, so that fluctuations in the reading levels in a main scanning direction are removed. Consequently, in each main scanning position, in a case where a relation between the reading level of the white background plate and the reading level of the document surface collapses, the correction cannot be appropriately performed.

On the other hand, if noise reduction using a non-liner filer by the noise reducer 225 is used, a process to be performed changes (a pixel to be referred changes) depending on an image characteristic. Consequently, a relation between a reading level of a white background plate and a reading level of a document surface may change.

To prevent influence of such a change, in the present embodiment, shading correction is performed on data that has undergone removal calculation in the removal calculator 226, and noise reduction is performed by the noise reducer 225 subsequent to the shading correction. With such a configuration, fluctuations in reading levels in a main scanning direction due to the shading correction can be appropriately corrected, and a high quality image without reading density unevenness can be provided.

According to the present embodiment, noise reduction is performed subsequent to image correction (e.g., shading correction). Therefore, an image change in a main scanning direction due to the noise reduction can prevented, and the image correction (e.g., shading correction) can be appropriately performed.

Fifth Embodiment

A fifth embodiment is described.

The fifth embodiment differs from the first through fourth embodiments in that a noise reducer 225 is disposed in each of stages preceding and following a removal calculator 226. Hereinafter, components and configurations that differ from components and configurations of the first through fourth embodiments will be described, and description of like components will be omitted.

Figure 15:
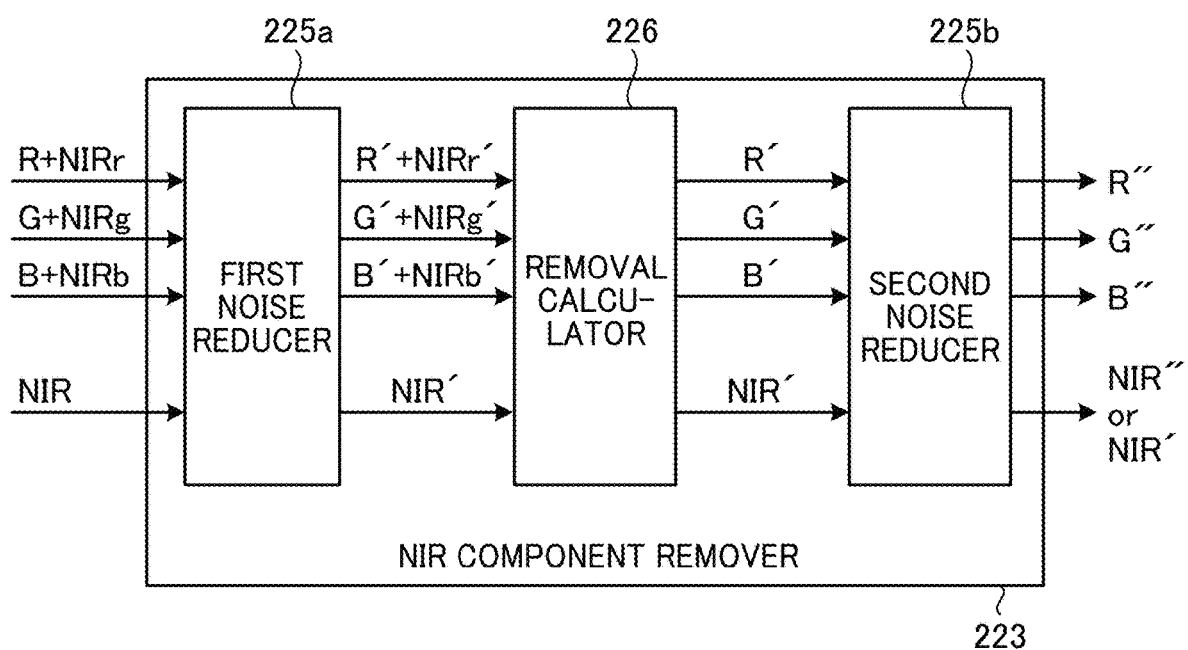
FIG. 15 is a block diagram illustrating a configuration of a NIR component remover according to a fifth embodiment.

FIG. 15 is a block diagram illustrating a configuration of a NIR component remover 223 according to the fifth embodiment. As illustrated in FIG. 15, the NIR component remover 223 receives a visible NIR mixture image and a NIR image acquired by an image sensor 9.

The NIR component remover 223 of the present embodiment includes a first noise reducer 225a, a removal calculator 226, and a second noise reducer 225b. That is, the NIR component remover 223 includes two noise reducers respectively disposed in stages preceding and following the removal calculator 226.

The first noise reducer 225a uses a linear filter to perform a noise reduction process on the visible NIR mixture image and the NIR image, which have been received.

The removal calculator 226 uses the output data from the first noise reducer 225a to perform a removal calculation process by which a NIR component is removed from the visible NIR mixture image.

The second noise reducer 225b uses a non-linear filter to perform a noise reduction process on the data subsequent to the removal calculation process. The second noise reducer 225b may or may not perform a noise reduction process on a NIR image.

The NIR component remover 223 of the present embodiment removes a certain amount of noise by using a linear filter in the first noise reducer 225a prior to removal calculation. Accordingly, even if an offset process is not performed on a visible NIR mixture image, the NIR component remover 223 of the present embodiment can reduce degradation in color reproduction due to zero clipping at the removal calculation as described in FIGS. 7A, 7B, and 12A through 12C.

Moreover, the NIR component remover 223 of the present embodiment performs a noise reduction process using a non-linear filter in the second noise reducer 225b subsequent to the removal calculation. Such noise reduction can further reduce noise while preventing resolution degradation, and thus quality of an image to be output in a following stage can be enhanced.

According to the present embodiment, therefore, even if an offset process is not performed, a noise reduction process in the first noise reducer 225a can reduce an error that occurs at removal calculation, and a noise reduction process in the second noise reducer 225b by using a filter that prevents resolving power degradation can reduce roughness degradation.

Figure 16:
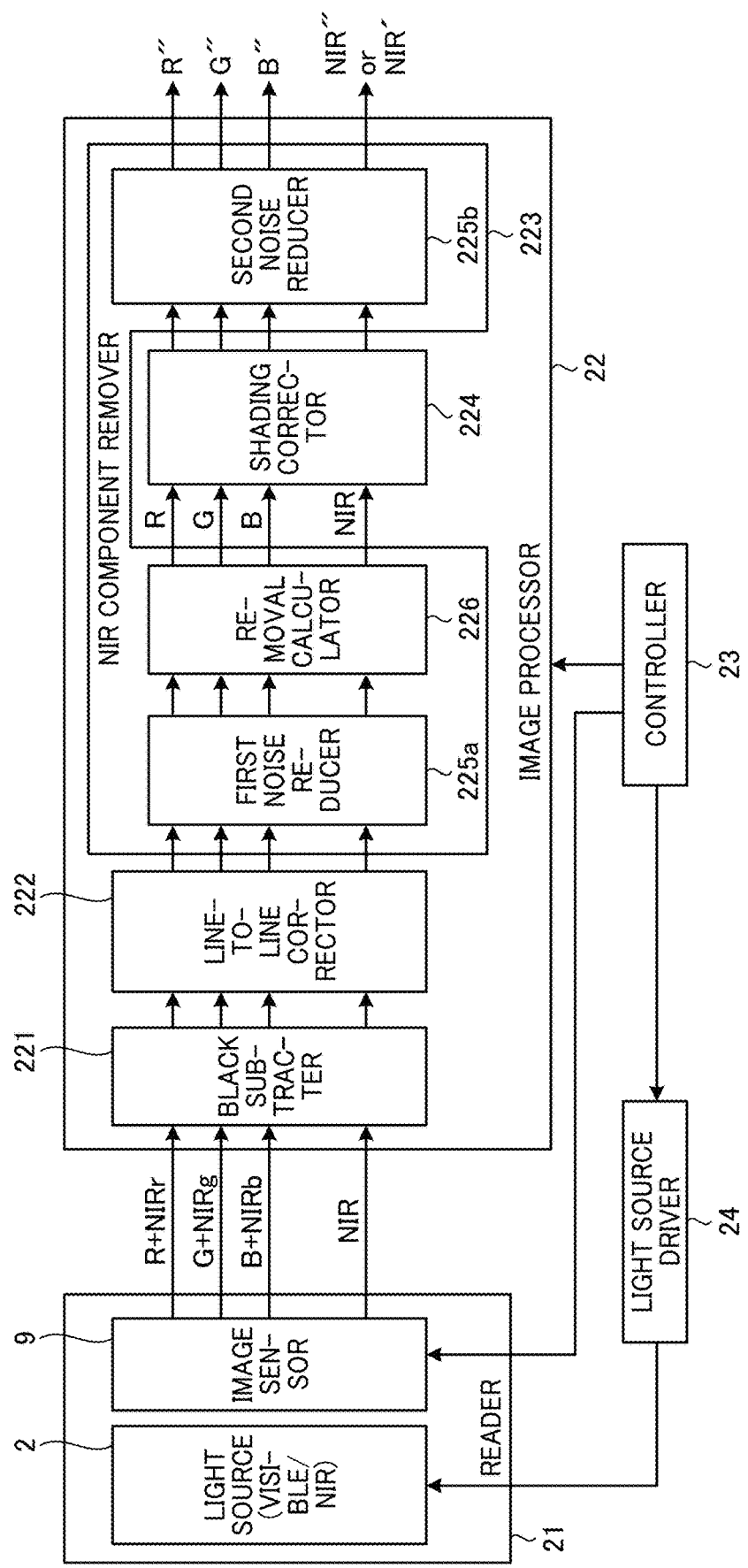
FIG. 16 is a block diagram illustrating a modification of the image reading device.

FIG. 16 is a block diagram illustrating a modification of the image reading device 101. As illustrated in FIG. 16, the NIR component remover 223 can include the second noise reducer 225b in a stage following the shading corrector 224.

Accordingly, the noise reduction by the second noise reducer 225b is performed subsequent to the shading correction. Such a configuration enables the shading correction to be appropriately performed. More particularly, fluctuations in reading levels in a main scanning direction due to the shading correction can be appropriately corrected, and a high quality image without reading density unevenness can be provided.

Sixth Embodiment

A sixth embodiment is described.

The sixth embodiment differs from the first through fifth embodiments in that noise reduction is switched. Hereinafter, components and configurations that differ from components and configurations of the first through fifth embodiments will be described, and description of like components will be omitted.

Figure 17:
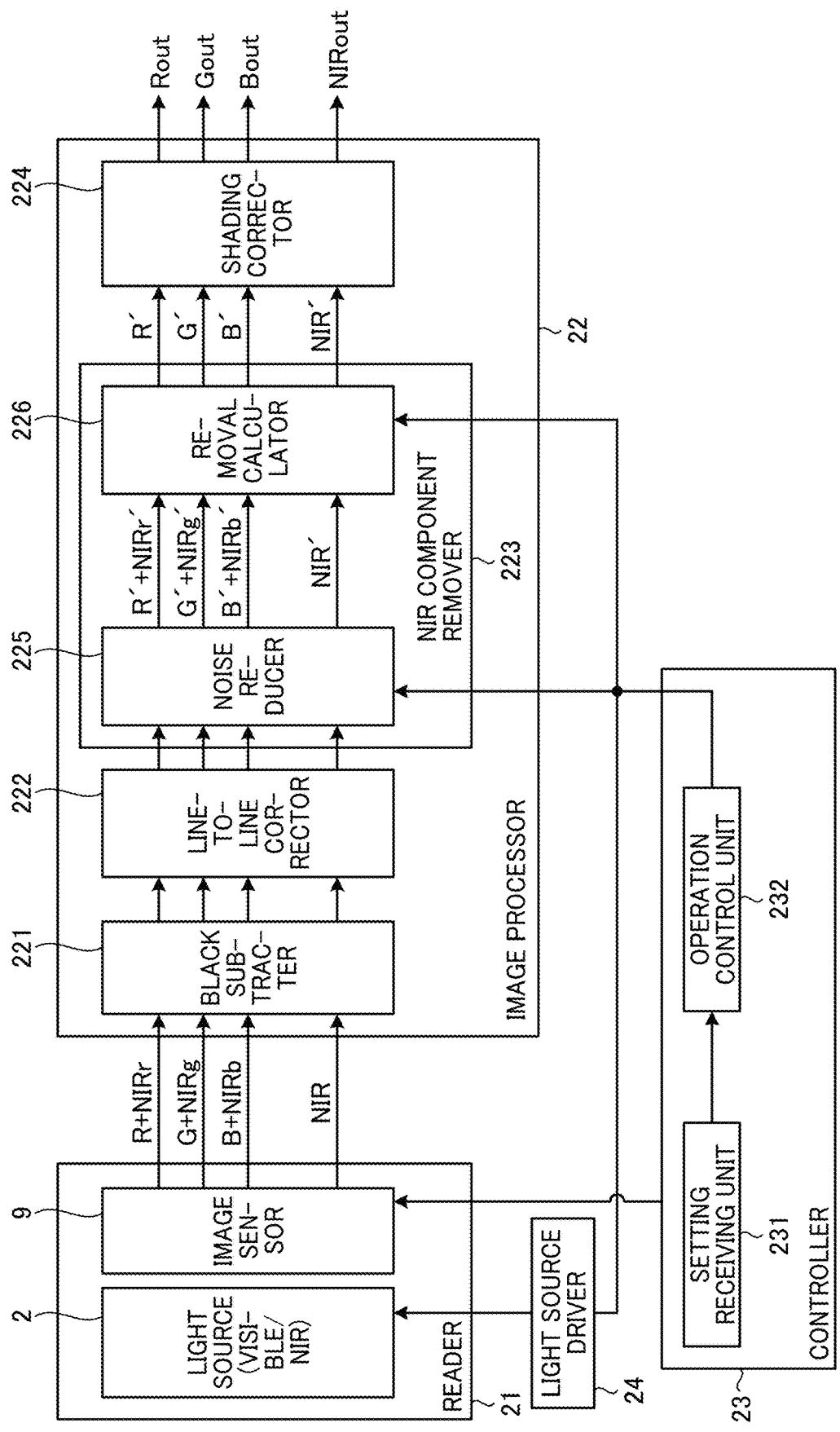
FIG. 17 is a block diagram illustrating an electric connection of each component of an image reading device according to a sixth embodiment.

FIG. 17 is a block diagram illustrating an electric connection of each component of an image reading device 101 according to the sixth embodiment. As illustrated in FIG. 17, the image reading device 101 includes a reader 21, an image processor 22, a setting receiving unit 231, and an operation control unit 232. The setting receiving unit 231 and the operation control unit 232 are included in a controller 23.

The image processor 22 includes a black subtracter 221, a line-to-line corrector 222, a NIR component remover 223, and a shading corrector 224.

The setting receiving unit 231 outputs mode information that is set by a user via an operation device such as an operation panel to the operation control unit 232.

The operation control unit 232 controls operations of the reader 21 and the image processor 22 according to the mode information which has been set in the setting receiving unit 231. More particularly, the operation control unit 232 controls lighting of a light source 2 and/or the noise reducer 225 and the removal calculator 226 of the NIR component remover 223 to switch operations according to the mode information set in the setting receiving unit 231.

FIG. 18 is a diagram illustrating examples of operation control based on mode settings. As illustrated in FIG. 18, for example, if a user sets a scan operation for scanning a simple document (e.g., a character document or a photograph document), only a visible light source is operated to acquire an image of the document (the character document or the photograph document). In such a case, operation of the NIR component remover 223 is not necessary.

On the other hand, if the user sets a scan operation for scanning a character document and an invisible latent image included in the character document, the visible light source and a NIR light source are simultaneously operated to acquire both of visible and invisible images. In such a case, since removal of a NIR component is necessary, not only removal calculation is set to ON but also noise reduction is set to ON to reduce image quality degradation due to noise degradation at removal calculation.

Herein, an increase in noise reduction strength may lower resolution. In the character document scanning, resolving power is more concerned than image quality degradation due to roughness caused by noise. Thus, although the noise reduction is performed, strength of the noise reduction is desirably suppressed.

Moreover, if the user sets a scanning operation for scanning a photograph document and an invisible latent image included in the photograph document, the visible light source and the NIR light source are simultaneously operated to acquire both of visible and invisible images. In such a case, since removal of a NIR component is necessary, removal calculation is set to ON. In addition, noise reduction is set to ON to reduce image quality degradation caused by noise degradation in the removal calculation.

In the photograph document scanning, since image quality degradation due to roughness is more concerned than resolving power and prevention of the image quality degradation is necessary, strength of the noise reduction is desirably set to a certain extent.

Moreover, image quality can be affected by an infrared component excited from a visible light source or a very small amount of an infrared component in the visible light source depending on a specific target object such as a phosphor. In such a case, since the infrared component needs to be removed, only the visible light source is turned on and removal calculation and noise reduction are set to ON.

According to the present embodiment, the control is switched according to a setting made by a user, so that a suitable process can be performed on a document to output the document with image quality desired by the user.

The present embodiment can employ a combination of control methods other than the combination illustrated in FIG. 18. For example, a related-art visible light source including a NIR component may be used. In such a case, even if only the visible light is turned on, NIR component removal can be set to ON, and thus image quality can be enhanced.

FIG. 19 is a diagram illustrating one example of a hardware configuration including a hard disk drive (HDD) 31, a central processing unit (CPU) 30, and a memory 32. The HDD 31 as a recording medium can store, for example, program code. The CPU 30 or a computer reads the program code stored in the HDD 31 to load the program code into the memory 32, and controls the image processor 22 based on the program code.

Each of the above embodiments has been described using an example in which an image forming apparatus as an image processing apparatus is a multifunctional peripheral having at least two of a copy function, a printer function, a scanner function and a facsimile function. However, each of the above embodiments can be applied to any image forming apparatus such as a copier, a printer, a scanner, and a facsimile device.

The present disclosure has been described above with reference to specific embodiments but is not limited thereto. Various modifications and enhancements are possible without departing from scope of the disclosure. It is therefore to be understood that the present disclosure may be practiced otherwise than as specifically described herein. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Program codes executed by the image processing apparatus to achieve the functions of the described embodiments may be provided in files in an installable format or an executable format that are recorded on computer-readable recording media such as a CD-ROM, a flexible disk (FD), a CD-R, and a digital versatile disk (DVD).

The program codes executed by the image processing apparatus may be stored on a computer connected to a network such as the Internet and provided by being downloaded via the network, or be provided or distributed via a network such as the Internet.

What is claimed is:

1. An image processing apparatus comprising:
   a light source configured to emit light including visible component light and invisible component light to a target object;
   an image sensor configured to receive the light reflected from the target object to detect a visible invisible mixture image including an invisible component and a visible component and an invisible image including an invisible component; and
   an invisible component remover, based on the visible invisible mixture image and the invisible image which have been detected, configured to remove the invisible component from the visible invisible mixture image to generate a visible image,
   the invisible component remover including:
      a removal calculator configured to perform a removal calculation process of an invisible component with respect to the visible invisible mixture image; and
      a noise reducer configured to perform a noise reduction process on at least one of an image to be input to the removal calculator and an image to be output from the removal calculator.

2. The image processing apparatus according to claim 1, wherein the noise reducer performs a filter process using a linear filter.

3. The image processing apparatus according to claim 1, wherein the noise reducer performs a filter process using a non-linear filter.

4. The image processing apparatus according to claim 1, wherein the noise reducer is disposed in a stage preceding the removal calculator.

5. The image processing apparatus according to claim 2, wherein the noise reducer is disposed in a stage preceding the removal calculator, and uses linear filters having a same strength for the visible invisible mixture image and the invisible image.

6. The image processing apparatus according to claim 1, wherein the noise reducer is disposed in a stage following the removal calculator.

7. The image processing apparatus according to claim 1, wherein the noise reducer is disposed in a stage following the removal calculator, and performs a noise reduction process on only a visible image that has undergone a removal calculation process.

8. The image processing apparatus according to claim 7, wherein the invisible component remover includes:
   an offsetter configured to perform an offset process to provide an offset amount to the visible invisible mixture image; and
   an offset remover, after a removal calculation process using the invisible image and the visible invisible mixture image which has undergone the offset process performed by the offsetter and a noise reduction process, configured to remove the offset amount provided by the offsetter from the visible image which has undergone the noise reduction process.

9. The image processing apparatus according to claim 8, wherein the offsetter determines an offset amount according to an amount of noise of the image processing apparatus.

10. The image processing apparatus according to claim 1, further comprising an image corrector configured to perform an image correction process on each of the visible image from which an invisible component has been removed and the invisible image,
    wherein the noise reducer is disposed in a stage following the removal calculator and a stage following the image corrector.

11. The image processing apparatus according to claim 1, wherein the noise reducer includes:
    a first noise reducer disposed in a stage preceding the removal calculator and configured to perform a noise reduction process on the visible invisible mixture image and the invisible image; and
    a second noise reducer disposed in a stage following the removal calculator and configured to perform a noise reduction process on data subsequent to a removal calculation process.

12. The image processing apparatus according to claim 11, wherein the first noise reducer performs a filter process using a linear filter and the second noise reducer performs a filter process using a non-linear filter.

13. The image processing apparatus according to claim 11, further comprising an image corrector configured to perform an image correction process on each of the visible image from which an invisible component has been removed and the invisible image,
wherein the second noise reducer is disposed in a stage following the image corrector.

14. The image processing apparatus according to claim 1, wherein the noise reducer determines noise reduction strength according to a mixture ratio of visible components to invisible components.

15. The image processing apparatus according to claim 1, further comprising control circuitry configured to:
receive a setting of mode information; and
control a processing operation according to the mode information, and control the light source or the invisible component remover according to the mode information.

16. An image processing method for an image processing apparatus including a light source configured to emit light including visible component light and invisible component light to a target object and an image sensor configured to receive the light reflected from the target object to detect a visible invisible mixture image including an invisible component and a visible component and an invisible image including an invisible component, the image processing method comprising:
removing, based on the visible invisible mixture image and the invisible image which have been detected, the invisible component from the visible invisible mixture image to generate a visible image, the removing including:
performing a removal calculation process of an invisible component with respect to the visible invisible mixture image; and
performing a noise reduction process on at least one of an image to be input to the removal calculation process and an image to be output from the removal calculation process.

17. A non-transitory computer-readable recording medium storing program code that causes a computer controlling an image processing apparatus including a light source configured to emit light including visible component light and invisible component light to a target object and an image sensor configured to receive the light reflected from the target object to detect a visible invisible mixture image including an invisible component and a visible component and an invisible image including an invisible component to function as an invisible component remover, based on the visible invisible mixture image and the invisible image which have been detected, configured to remove the invisible component from the visible invisible mixture image to generate a visible image, the program code causing the invisible component remover to function as:
a removal calculator configured to perform a removal calculation process of an invisible component with respect to the visible invisible mixture image; and
a noise reducer configured to perform a noise reduction process on at least one of an image to be input to the removal calculator and an image to be output from the removal calculator.

* * * * *